United States Patent [19]

Kato

[11] Patent Number: 5,245,913
[45] Date of Patent: Sep. 21, 1993

[54] PISTON OF INTERNAL COMBUSTION ENGINE

[75] Inventor: Hirofumi Kato, Kanagawa Prefecture, Japan

[73] Assignee: Atsugi Unisia Corporation, Kanagawa Prefecture, Japan

[21] Appl. No.: 896,227

[22] Filed: Jun. 10, 1992

[30] Foreign Application Priority Data

Jun. 11, 1991 [JP] Japan ............................... 3-51957[U]

[51] Int. Cl.$^5$ .............................................. F16J 1/04
[52] U.S. Cl. .................................... 92/212; 92/222; 92/224; 92/126; 92/178; 123/193.6
[58] Field of Search ................. 92/126, 178, 212, 222, 92/224; 123/193.6

[56] References Cited

U.S. PATENT DOCUMENTS

| | | | |
|---|---|---|---|
| 3,906,923 | 9/1975 | Harker | 92/224 |
| 4,158,328 | 6/1979 | Beardmore | 92/212 |
| 4,677,900 | 7/1987 | Philby | 92/212 |

FOREIGN PATENT DOCUMENTS

| | | | |
|---|---|---|---|
| 459707 | 10/1950 | Italy | 92/126 |
| 0081143 | 5/1982 | Japan | 123/193.6 |
| 62-8347 | 1/1987 | Japan . | |
| 0199658 | 8/1991 | Japan | 123/193.6 |
| 0199659 | 8/1991 | Japan | 123/193.6 |

Primary Examiner—Thomas E. Denion
Attorney, Agent, or Firm—Bachman & LaPointe

[57] ABSTRACT

A piston of an internal combustion engine, arranged to suppress engine noise and vibration while improving the frictional resistance and seizure resistance of a piston skirt. The piston skirt of the piston is formed at its outer peripheral surface with a pair of depressions. A projection having a spherical surface is formed at the bottom surface of each depression and protrudes radially and outwardly relative to the piston skirt. A heat-resistant pad is loosely fitted in each depression and has a cylindrical inner surface which is in slidable contact with the spherical surface of the projection, so that the pad makes its swinging movement in accordance with the oscillating rotational movement of the piston body around the axis of a piston pin during the reciprocating action of the piston.

6 Claims, 2 Drawing Sheets

PISTON OF INTERNAL COMBUSTION ENGINE

BACKGROUND OF THE INVENTION

1. Field of the Invention

This invention relates to improvements in a piston of an internal combustion engine, and more particularly to a piston arranged to improve noise and vibration suppression characteristics of the engine.

2. Description of the Prior Art

A variety of pistons for an internal combustion engine have been proposed and put into practical use. Of these, a piston arrangement as shown in FIG. 3 of the drawings is known and disclosed in Japanese Utility Model Provisional Publication No. 62-8347. In this piston arrangement of FIG. 3, a piston skirt 2 of a piston body 1 is fixedly provided at its outer surface with a pad 3 which is high in wear resistance and oil keeping ability thereby improving a slidingly moving characteristics of the piston body 1 relative to a cylinder wall.

However, such a piston arrangement seems not to take account of thermal expansion and behavior of the piston during a reciprocating movement of the piston. More specifically, the pad 3 and the piston body 1 are different in thermal expansion, and therefore the pad 3 cannot follow the expansion of the piston body 1. In addition, the piston body 1 makes its generally arcuate oscillating movement around the axis of a piston pin during the reciprocating movement of the piston, so that the pad 3 cannot follow this oscillating movement of the piston body 1. These make difficult to control the posture of the piston body during engine operation, thereby sharply degrading noise and vibration suppression characteristics of the engine.

SUMMARY OF THE INVENTION

It is an object of the present invention to provide an improved piston of an internal combustion engine, which can effectively overcome drawbacks encountered in conventional pistons.

Another object of the present invention is to provide an improved piston of an internal combustion engine, which can greatly improve noise and vibration suppression characteristics of the engine while lowering the frictional resistance and improving the seizure resistance characteristics of a piston skirt.

A further object of the present invention is to provide an improved piston of an internal combustion engine, which can be effectively controlled in posture against the wall of a cylinder even upon the oscillating movement of a piston body around the axis of a piston pin during the reciprocating action of the piston.

A piston of the present invention is of an internal combustion engine and comprised of a piston body having a piston skirt. The piston skirt is formed at its outer peripheral surface with a depression. A projection is formed at the bottom surface of the depression, and protrudes radially outwardly relative to the piston body. A tear-resistant pad is loosely fitted in the depression of the piston skirt. The inner surface of the pad is in contact with the projection so that the pad makes its swinging movement in accordance with the oscillating rotational movement of the piston body around the axis of a piston pin.

With the above piston, during operation of the engine, the pad of the piston is in slidable contact with the cylinder wall in relation to the reciprocating action of the piston, while the pad is in slidable contact with and swingably movable relative to the outer surface of the piston skirt in accordance with the oscillating rotational movement of the piston body. Accordingly, by virtue of the pad movable within the depression of the piston skirt, a posture control of the piston body can be accomplished to prevent a piston slap thereby improving noise and vibration suppression characteristics of the engine. Additionally, the pad improves the sliding movement characteristics of the piston relative to the cylinder wall, thereby achieving lowering the frictional resistance and improving the seizure resistance characteristics of the piston skirt during the reciprocating action of the piston. These improve fuel economy of the engine while increasing power output of the engine, thus greatly improving engine performance.

DETAILED DESCRIPTION OF THE INVENTION

Figure 1:
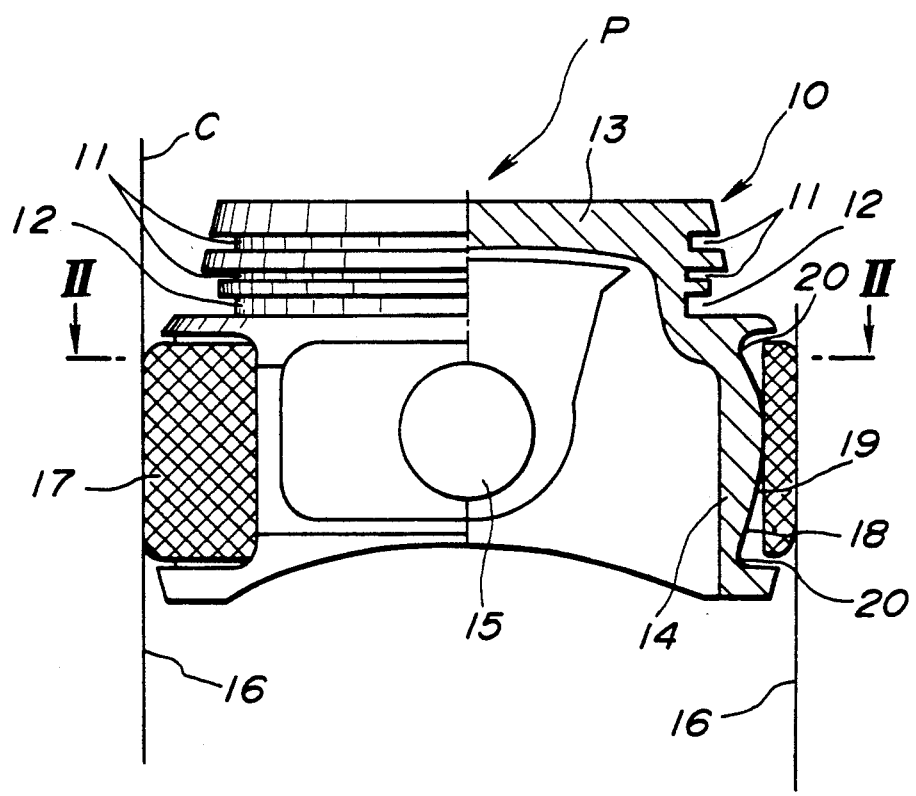
FIG. 1 is a front elevation, partly in section, of a preferred embodiment of a piston of an internal combustion engine, in accordance with the present invention.
Figure 2:
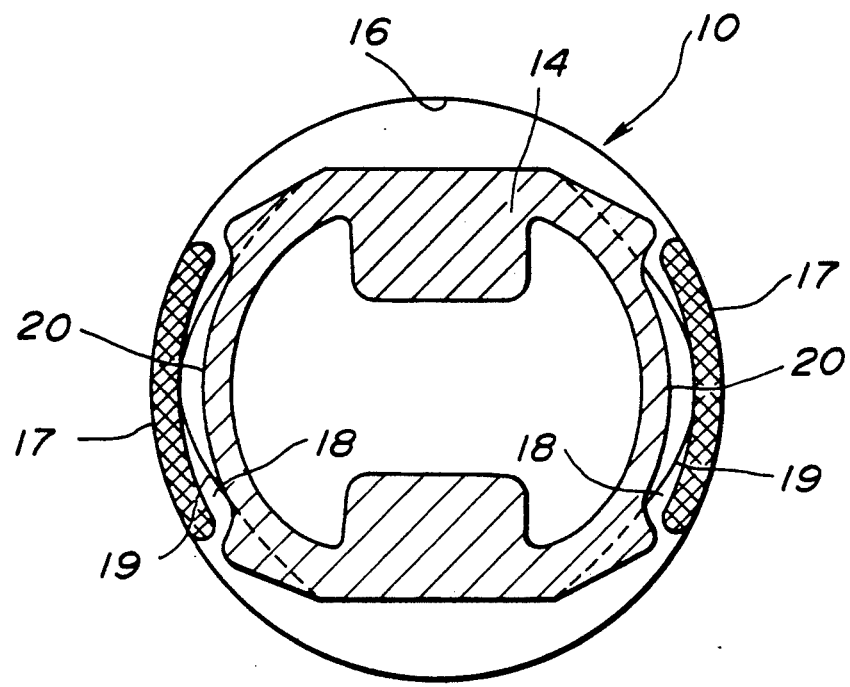
FIG. 2 is a cross-sectional view taken in the direction of arrows substantially along the line II—II of FIG. 1.
Figure 3:
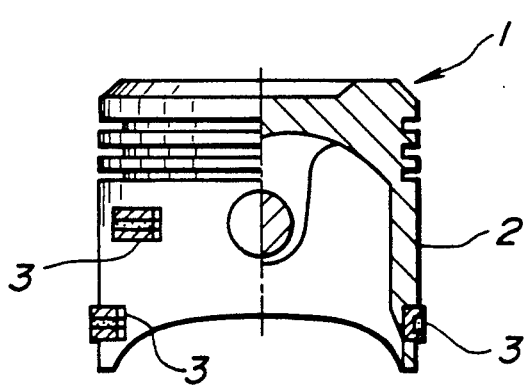
FIG. 3 is a front elevation, partly in section, of a conventional piston of an internal combustion engine.

Referring now to FIGS. 1 and 2 of the drawings, a preferred embodiment of a piston according to the present invention is illustrated by the reference character P. The piston 1 in this embodiment is for an automotive internal combustion engine (not shown) and to be slidably movably disposed in an engine cylinder C of the engine. The piston P comprises a generally cylindrical piston body 10 which includes a piston head 13 defining the bottom of a combustion chamber (not shown) of the engine. The piston head 13 is formed at its cylindrical side surface with depressions 11 for receiving compression rings (not shown) and a depression 12 for receiving an oil control ring (not shown).

A generally cylindrical piston skirt 14 is formed integral with the piston head 13 and extends downward in FIG. 1 from the piston head 13. The piston skirt 14 has a generally cylindrical peripheral surface which is generally parallel with a cylindrical wall 16 of the engine cylinder C. The cylinder wall 16 may be an inner wall surface of a cylinder liner (not shown). Additionally, the piston body 10 is formed at the piston skirt 14 with a pin hole 15 in which a piston pin (not shown) is fitted.

As shown, the piston skirt 14 is formed at its cylindrical peripheral surface with a pair of depressions 18, 18 which are located generally symmetrical with each other with respect to an imaginary vertical plane (not shown) passing through the axis (not shown) of the pin hole 15. Additionally, the depressions 18, 18 are located at the thrust surfaces of the piston P, the piston P being thrusted at the thrust surfaces against the cylinder wall 16 during the reciprocating action of the piston P. Each depression 18 extends laterally and vertically along the cylindrical outer surface of the piston skirt 14.

A pair of heat-resistant pads 17, 17 are loosely fitted respectively in depressions 18, 18 to be located between the outer surface of the piston skirt 14 and the cylinder wall 16. In other words, each pad 17 is formed in the shape of a part of a cylindrical wall so as to have a generally cylindrical inner surface. Each pad 17 is formed generally rectangular and arcuate in cross-section as viewed from a direction of the axis of the piston body 10 or in FIG. 2. The pad 17 is formed of a ceramic or plastic which is low in frictional resistance, high in seizure resistance and high in wear resistance.

Additionally, a mountain-shaped projection 19 is integrally formed at the bottom surface (generally parallel with the cylinder wall 16 of each depression 18 and radially outwardly protrudes relative to the piston P, so that the top of the projection 19 is located at the central part of the depression 18. The projection 19 has a spherical surface which is in contact with the cylindrical inner surface of the pad 17, so that the pad 17 is swingably movable in relation to an oscillating rotational movement of the piston body 10 around the axis of the piston pin during a reciprocating action of the piston P and to a thermal expansion of the piston skirt 14. Additionally, the projection 19 functions to urge the pad 17 against the cylinder wall 16. As seen from FIGS. 1 and 2, a rectangular continuous gutter 20 is formed along the periphery of each depression 18, forming a part of the depression 18. This gutter 20 functions to serve as a stop of the swingingly moving pad 17, in which the peripheral section of the pad 17 is to be received in the gutter 20, i.e., to be brought into contact with a wall surface defining the gutter 20 or the depression 18.

With the above-discussed piston P, during a reciprocating movement of the piston P along the cylinder wall 16 or in a vertical direction in FIG. 1, the pad 17 slidingly contacts with and moves along the cylinder wall 16. At this time, each pad 17 makes its swinging movement upon being guided by the spherical surface of the projection 19 formed at the bottom surface of the depression 18, following the oscillating rotational movement of the piston body 10 around the axis of the piston pin and in accordance with the thermal expansion of the piston skirt 14. Accordingly, the frictional resistance of the piston body 10 relative to the cylinder wall 16 can be sharply reduced while improving the seizure resistance of the piston body 10. Furthermore, by virtue of the swinging movement of the pad 17 following the oscillating rotational movement of the piston body 10, the pad 17 interposed between the piston skirt 14 and the cylinder wall 16 is always maintained in contact with the cylinder wall 16 without producing a large clearance therebetween while serving as a cushioning material when the piston skirt 14 strikes against the cylinder wall 16. These effectively prevent piston slap thereby improving noise and vibration suppression characteristics of the engine.

What is claimed is:

1. A piston of an internal combustion engine, comprising:
    a piston body having a piston skirt, said piston skirt being formed at its outer peripheral surface with first and second depressions which are located generally opposite to each other with respect to a first plane passing through an axis of a pin hole for a piston pin, said piston skirt having first and second projections which are formed respectively at bottom surfaces of said first and second depressions, each projection protruding radially outwardly relative to said piston body and having a rounded shaped surface on a second plane which is perpendicular to said first plane so as to form first and second gutters, said first and second gutters being located opposite to each other with respect to said projection on said second plane; and
    first and second heat-resistant pads which are loosely fitted respectively in said first and second depressions of said piston skirt, an inner surface of each pad being in contact with said projection so that said pad makes a swinging movement in accordance with an oscillating rotational movement of said piston body around the axis of the piston pin, each pad having a generally cylindrical surface which is in contact with the rounded surface of said projection at a central portion on said second plane so that said pad makes the said swinging movement around said central portion, each pad having first and second ends which are opposite to each other with respect to the pad central portion and capable of being plunged respectively into said first and second gutters in said piston body upon the oscillating rotational movement of said piston body.

2. A piston as claimed in claim 1, wherein each of said first and second depression is formed curved along a generally cylindrical outer surface of said piston skirt, wherein said each of said first and seconds pads is formed curved along the generally cylindrical outer surface of said piston skirt.

3. A piston as claimed in claim 2, wherein said first and second depressions are formed respectively at first and second thrust surfaces through which said piston body is thrusted against a wall of an engine cylinder during reciprocating action of said piston.

4. A piston as claimed in claim 1, wherein said first and second gutters are formed respectively around said first and second projections, each gutter forming part of each depression, a peripheral portion of each pad being receivable in said gutter.

5. A piston as claimed in claim 1, wherein said pads are formed of a material selected from the group consisting of a ceramic and a plastic which are high in frictional resistance and high in wear resistance.

6. A piston of an internal combustion engine, comprising:
    a piston body having a piston skirt, said piston skirt being formed at its outer peripheral surface with first and second depressions which are located generally opposite to each other with respect to a plane passing through an axis of a pin hole for a piston pin, said piston skirt having first and second projections which are formed respectively at bottom surfaces of said first and second depressions, each projection protruding radially outwardly relative to said piston body and having a generally spherical surface; and
    first and second heat-resistant pads which are loosely fitted respectively in said first and second depressions of said piston skirt, an inner surface of each pad being in contact with said projection so that said pad makes a swinging movement in accordance with an oscillating rotational movement of said piston body around the axis of the piston pin, each pad having a generally cylindrical inner surface which is in contact with the spherical surface of said projection.

* * * * *